US010678608B2

(12) United States Patent
Zacks

(10) Patent No.: US 10,678,608 B2
(45) Date of Patent: Jun. 9, 2020

(54) INTERACTING WITH A SOURCE OBJECT VIA A VIRTUAL OBJECT

(71) Applicant: Red Hat Israel, Ltd., Ra'anana (IL)

(72) Inventor: Simcha Zacks, Ra'anana (IL)

(73) Assignee: Red Hat Israel, Ltd., Ra'anana (IL)

(*) Notice: Subject to any disclaimer, the term of this patent is extended or adjusted under 35 U.S.C. 154(b) by 486 days.

(21) Appl. No.: 15/056,677

(22) Filed: Feb. 29, 2016

(65) Prior Publication Data

US 2017/0249196 A1 Aug. 31, 2017

(51) Int. Cl.
*G06F 9/54* (2006.01)
(52) U.S. Cl.
CPC ............ *G06F 9/541* (2013.01); *G06F 9/547* (2013.01)
(58) Field of Classification Search
CPC ................................. G06F 9/541; G06F 9/547
See application file for complete search history.

(56) References Cited

U.S. PATENT DOCUMENTS

| | | | |
|---|---|---|---|
| 6,915,301 B2 | 7/2005 | Hirsch | |
| 7,617,504 B1* | 11/2009 | Hill | G06F 9/548 709/213 |
| 7,876,748 B1 | 1/2011 | Conner et al. | |
| 8,244,775 B1 | 8/2012 | Bak et al. | |
| 8,311,959 B2 | 11/2012 | Aggarwal et al. | |
| 8,359,336 B2 | 1/2013 | Arora et al. | |
| 2002/0059358 A1* | 5/2002 | Kanamori | G06F 9/4843 718/107 |
| 2003/0191870 A1* | 10/2003 | Duggan | G06F 9/541 719/331 |
| 2004/0103114 A1* | 5/2004 | Sesma | G06F 9/541 |
| 2005/0229186 A1* | 10/2005 | Mitchell | G06F 9/465 719/315 |
| 2005/0229189 A1* | 10/2005 | McManus | G06F 8/00 719/330 |
| 2015/0074117 A1 | 3/2015 | Gorelik et al. | |

FOREIGN PATENT DOCUMENTS

JP 2000148555 A2 2/2015

OTHER PUBLICATIONS

Jiabin Li et al, *Arms: A Decentralised Naming Model for Object-Based Distributed Computing Systems*, 2010, Murdoch University, http://citeseerx.ist.psu.edu/viewdoc/download?doi=10.1.1.670.6258 &rep=rep1&type=pdf.

* cited by examiner

*Primary Examiner* — Umut Onat
(74) *Attorney, Agent, or Firm* — Haynes and Boone, LLP

(57) ABSTRACT

An example method of interacting with a source object via a virtual object, the method includes associating a first set of properties of a virtual object with a second set of properties of a source object that is defined in a program. The method also includes defining a set of functions corresponding to the associated first and second sets of properties and receiving a first request to instantiate the virtual object. The source object is instantiated in response to the first request. The method further includes receiving a second request to perform an operation using the first set of properties of the virtual object and executing the set of functions in response to the second request. The method also includes updating the second set of properties of the source object in accordance with a result of the executed set of functions.

20 Claims, 6 Drawing Sheets

INTERACTING WITH A SOURCE OBJECT VIA A VIRTUAL OBJECT

BACKGROUND

When creating a local data object based on an interaction with a source data object received in response to invoking an application programming interface (API), the local data object must be kept in sync with the source data object. Unfortunately, this is difficult for various reasons. For example, the local data object may have a different naming standard or convention for properties than the source data object. In another example, the format of the local data object properties may be different from the source data object. In another example, not all properties or functionality of the source data object should be available from within the local data object.

BRIEF SUMMARY

It may be desirable to link the local and source objects. Methods, systems, and techniques for interacting with a source object via a virtual object are provided.

According to some embodiments, a method of interacting with a source object via a virtual object includes associating, by a computing device, a first set of properties of a virtual object with a second set of properties of a source object. The source object is defined in a program. The method also includes defining, by the computing device, a set of functions corresponding to the associated first and second sets of properties. The method further includes receiving, by the computing device, a first request to instantiate the virtual object. The method also includes instantiating the source object in response to the first request. The method further includes receiving, by the computing device, a second request to perform an operation using the first set of properties of the virtual object. The method also includes executing the set of functions corresponding to the associated first and second sets of properties. The method further includes updating the second set of properties of the source object in accordance with a result of the executed set of functions.

According to some embodiments, a system for interacting with a source object via a virtual object includes a translation engine that associates a first set of properties of a virtual object with a second set of properties of a source object and defines a set of functions corresponding to the associated first and second sets of properties. The source object is defined in a program stored at a computing device. The system also includes an object property builder that receives a first request to instantiate the virtual object, instantiates the source object in response to the first request, receives a second request to perform an operation using the first set of properties of the virtual object, executes the set of functions corresponding to the associated first and second sets of properties in response to the second request, and updates the second set of properties of the source object in accordance with a result of the executed set of functions.

According to some embodiments, a non-transitory machine-readable medium includes a plurality of machine-readable instructions that when executed by one or more processors are adapted to cause the one or more processors to perform a method including: associating, by a computing device, a first set of properties of a virtual object with a second set of properties of a source object, the source object being defined in a program; defining, by the computing device, a set of functions corresponding to the associated first and second sets of properties; receiving, by the computing device, a first request to instantiate the virtual object; instantiating the source object in response to the first request; receiving, by the computing device, a second request to perform an operation using the first set of properties of the virtual object; executing the set of functions corresponding to the associated first and second sets of properties in response to the second request; and updating the second set of properties of the source object in accordance with a result of the executed set of functions.

According to some embodiments, an apparatus for interacting with a source object via a virtual object includes means for associating a first set of properties of a virtual object with a second set of properties of a source object. The method also includes means for defining a set of functions corresponding to the associated first and second sets of properties. The method further includes means for receiving a first request to instantiate the virtual object. The method also includes means for instantiating the source object in response to the first request. The method further includes means for receiving a second request to perform an operation using the first set of properties of the virtual object. The method also includes means for executing the set of functions corresponding to the associated first and second sets of properties. The method further includes means for updating the second set of properties of the source object in accordance with a result of the executed set of functions.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

DETAILED DESCRIPTION

I. Overview
II. Example System Architecture
III. Example Process Flows
IV. Example Method
V. Example Computing System I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

Unless specifically stated otherwise, as apparent from the following discussion, it is appreciated that throughout the description, discussions utilizing terms such as "determining," "storing," "defining," "receiving," "sending," "instantiating," "executing," "updating," "searching," "identifying," "logging," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

II. Example System Architecture

Figure 1:
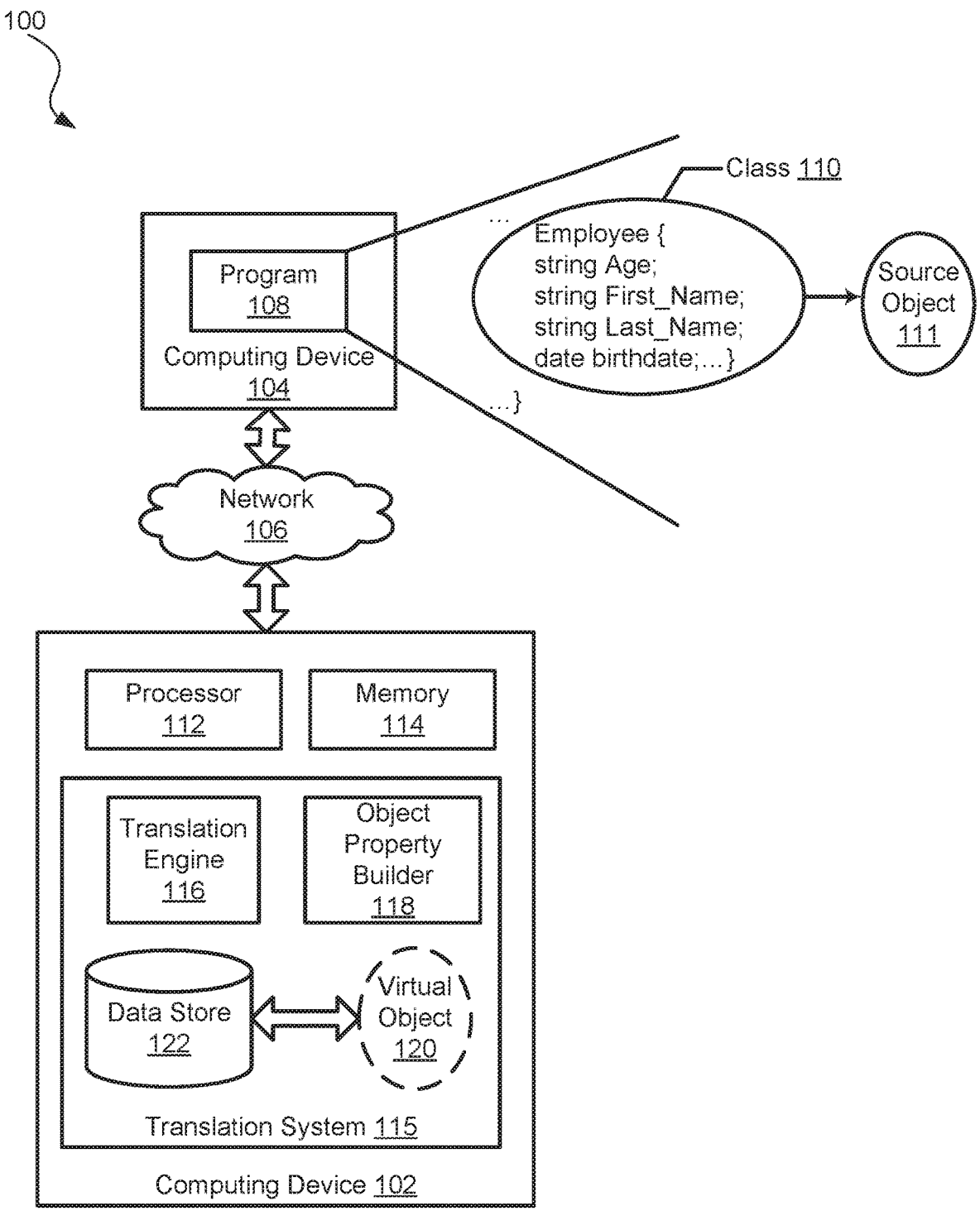
FIG. 1 is a block diagram illustrating a system for interacting with a source object via a virtual object in accordance with one or more embodiments.

FIG. 1 is a block diagram illustrating a system 100 for interacting with a source object via a virtual object in accordance with one or more embodiments. System 100 includes computing devices 102 and 104 coupled over a network 106. Computing device 104 is remote from computing device 102, and these computing devices may communicate with each other over network 106. Network 106 may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing. Although two computing devices are illustrated, other embodiments including fewer than or more than two computing devices are within the scope of the present disclosure.

Computing device 104 includes a program 108, which is stored remotely from computing device 102. Although program 108 is illustrated as being stored remotely from computing device 102, it should be understood that in other examples, program 108 may be stored in computing device 102.

Computing device 104 may execute a program 108 that is written in a high-level programming language. In an example, program 108 is written in an object-oriented programming language that defines classes. A data object may be a self-contained entity that has state and behavior and represents an instance of a class. The data object's state may be described as its fields and properties, and the data object's behavior may be described by its methods and events. Program 108 may be, for example, a JAVA or a C++ program. Program 108 may include code that creates instances of a class, and an instance of a particular class may expose methods and properties defined by that class. In an example, an instruction in program 108 may include an operator that creates an instance of a class.

In the example illustrated in FIG. 1, program 108 includes a definition of an "Employee" class 110 that includes a set of properties and a set of methods. The "Employee" class 110 includes the properties "Age," "First_Name," and "Last_Name," which are of the string type. It should be understood that a class may include properties having other data types (e.g., integer, float, another class, etc.). Program 108 may execute on computing device 104 and include an instruction that instantiates an object of the "Employee" class 110 (e.g., "Employee employee1"). In response, computing device 104 instantiates the "Employee" class 110 by creating a source object 111. Source object 111 has the properties "Age," "First_Name," and "Last_Name," which may be modified by, for example, calling methods that cause the properties to be changed (e.g., "employee1.setAge(30)," which sets the "Age" property in source object 111 to "30.").

A developer may desire to provide a system to users (e.g., programmers) that leverages the functionality of program 108 with some modifications. For example, the developer may desire to include a security feature that checks that the employee's age entered into the system is an integer. The "Age" property in the "Employee" class 110 is of a string type and thus does not ensure data integrity because a user may enter in a value that is not an integer. It may be desirable to provide a customized interface into program 108 to users while leveraging the functionality of program 108. The developer may wrap the source object using the developer's own terminology and concepts and re-write the interface to the source object such that other users may use the developer's terminology and concepts. Additionally, the developer may add functionality to program 108.

The developer may design a virtual object that a user utilizes to interact with a source object. The user may be unaware that the source object exists. The virtual object may exist within the context of the source object in program 108, but not by itself. The user may use computing device 102 to interact with the source object via the virtual object. Computing device 102 includes a processor 112 and a memory 114. Processor 112 may represent one or more processors acting in concert. A "processor" may also be referred to as a "CPU" or "physical processor" herein. A processor shall refer to a device capable of executing instructions encoding arithmetic, logical, or I/O operations. In one illustrative example, a processor may follow the Von Neumann architectural model and may include an arithmetic logic unit (ALU), a control unit, and a plurality of registers. In a further aspect, a processor may be a single-core processor that is typically capable of executing one instruction at a time (or process a single pipeline of instructions), or a multi-core processor that may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket).

Memory 114 may be one or more of many different types of memory. "Memory" herein shall refer to volatile or non-volatile memory, such as random access memory (RAM), read-only memory (ROM), electrically erasable ROM (EEPROM), or any other memory capable of storing data. Some types of memory, such as solid state drives typically have relatively larger storage volume but relatively slower performance. Other types of memory, such as those used for RAM, are optimized for speed and are often referred to as "working memory." The various types of memory may store information in the form of software and data. The software may include an operating system, hypervisor 110, and various other software applications.

Computing device 102 also includes a translation system 115 including a translation engine 116 and an object property builder 118. Translation engine 116 may provide the developer with a user interface for associating a set of properties of source object 111 with a set of properties of virtual object 120. The developer may provide to translation engine 116 as input a set of properties of virtual object 120 and a set of properties of source object 111 to associate. The developer may design and define virtual object 120 as including a set of properties and a set of methods. In an example, virtual object 120 includes a "my_age" property, which is of the integer type and corresponds to the "Age" property in source object 111. In this example, if the "my_age" property of the virtual object 120 is used, the "Age" property in source object 111 is used for an operation. In another example, virtual object 120 includes a "my_fullname" property, which is of the string type and corresponds to the "First_Name" and "Last_Name" properties in source object 111. In this example, if the "my_fullname" property of the virtual object 120 is used, the "First_Name" and "Last_Name" properties in source object 111 are used for an operation. Translation engine 116 stores the one or more property associations in a data store 122. Data store 122 is a repository for persistently storing and managing collections of data. Data store 122 may be, for example, a database, a file, a hash map, etc.

Additionally, translation engine 116 may provide the developer with a user interface for defining a set of functions corresponding to the associated sets of properties of source object 111 and virtual object 120. The developer may provide to translation engine 116 as input a set of functions corresponding to the associated sets of properties. The set of functions may be executed in response to an indication that the set of properties of the virtual object 120 is invoked or to be used in an operation. The set of functions may be defined by the developer and its association with the sets of properties of source object 111 and virtual object 120 may be stored in data store 122. It should be understood that the set of functions associated with the properties of source object 111 and virtual object 120 may convey one or more functions and/or operations. The developer may use the set of functions to perform one or more operations on the values to be input into source object 111.

Object property builder 118 receives a request to instantiate virtual object 120 and instantiates the source object from program 108 in response to the request. Virtual object 120 is illustrated using dashed lines because the object is not actually instantiated. In particular, virtual object 120 does not have its "own memory." Rather, as will be explained in more detail below, virtual object 120's data is stored in the memory of source object 111 in memory 114 at computing device 102.

III. Example Process Flows

Figure 2A:
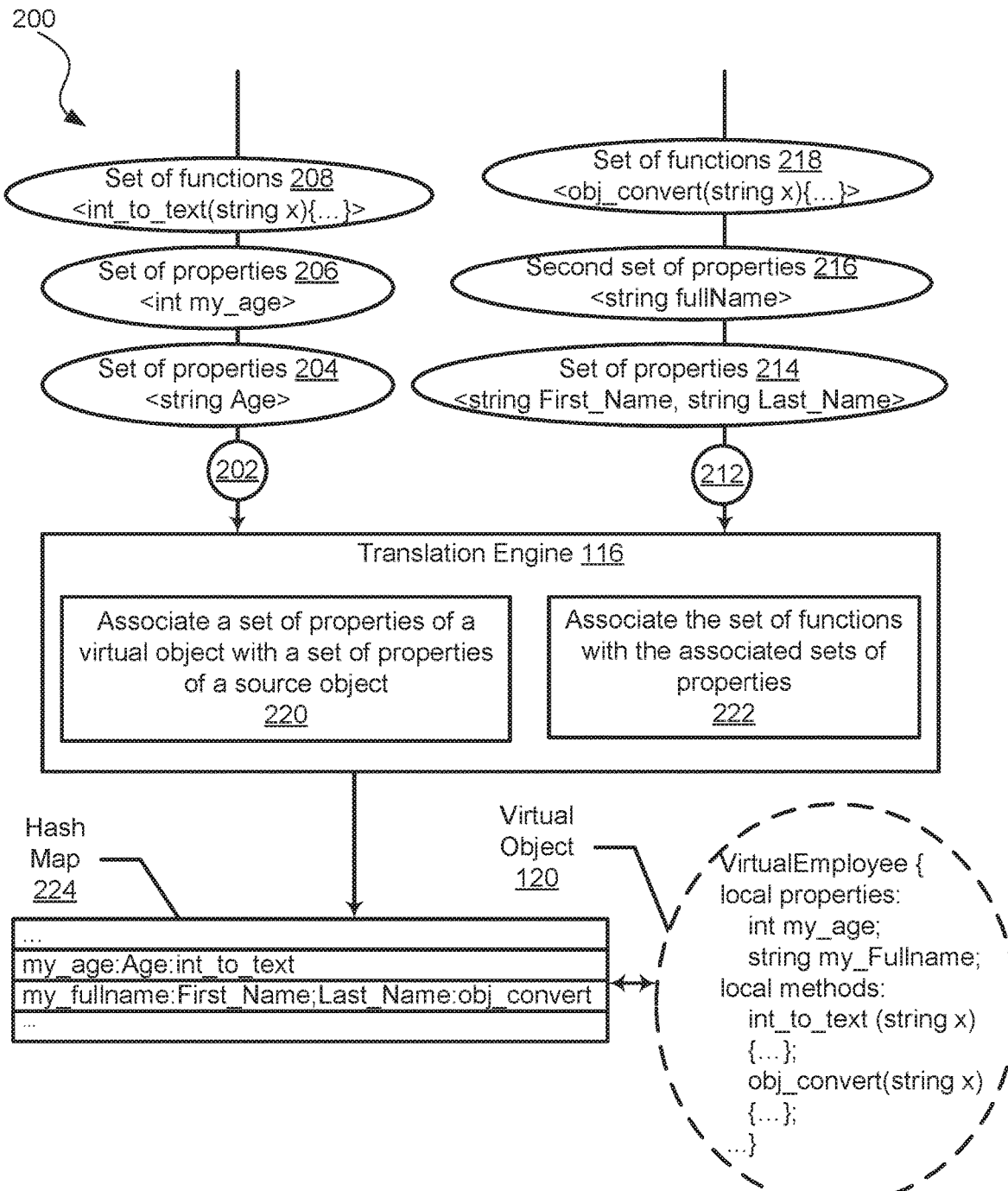
FIGS. 2A-2C are process flow diagrams for interacting with a source object via a virtual object in accordance with one or more embodiments.
Figure 2B:
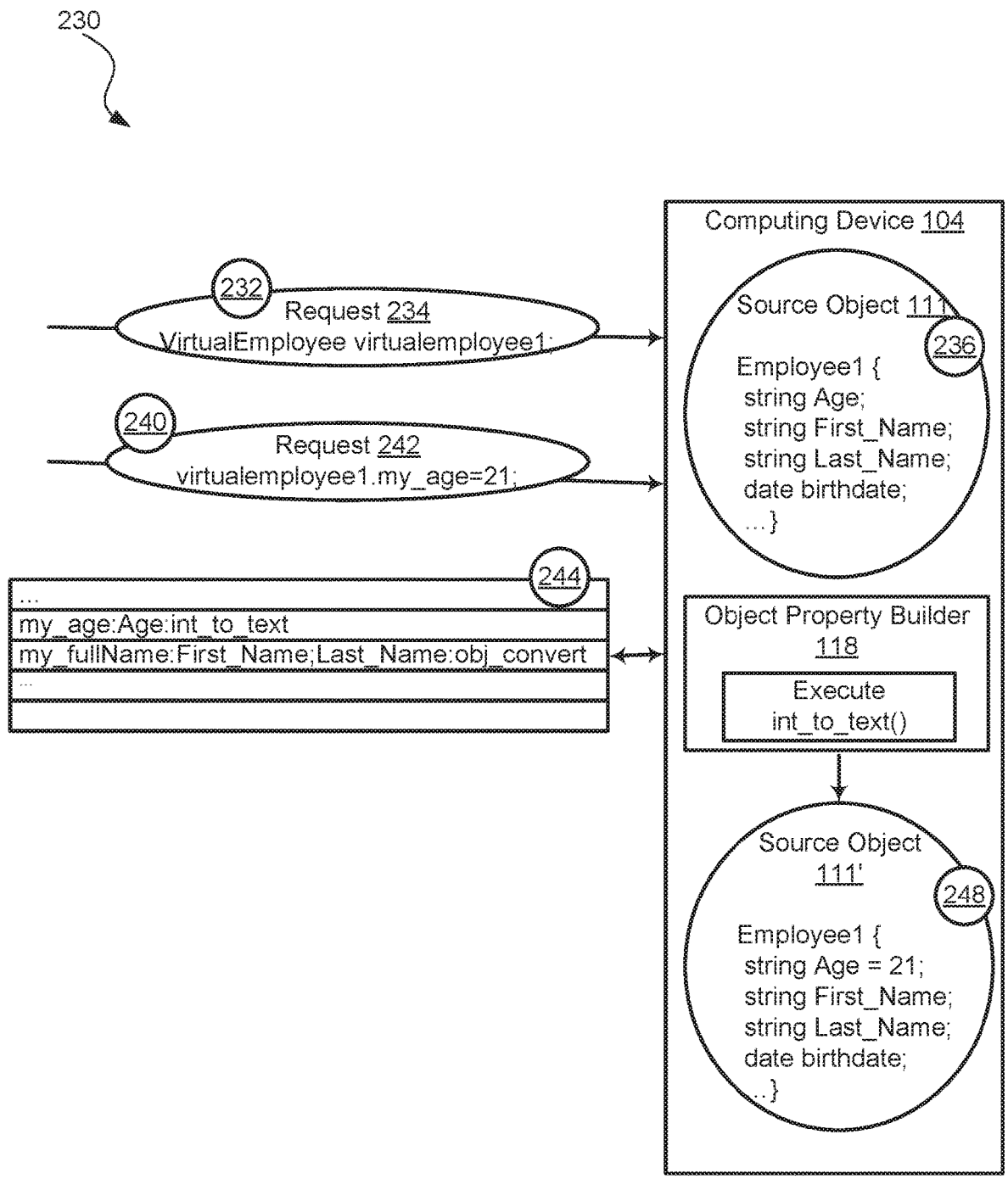
Figure 2C:
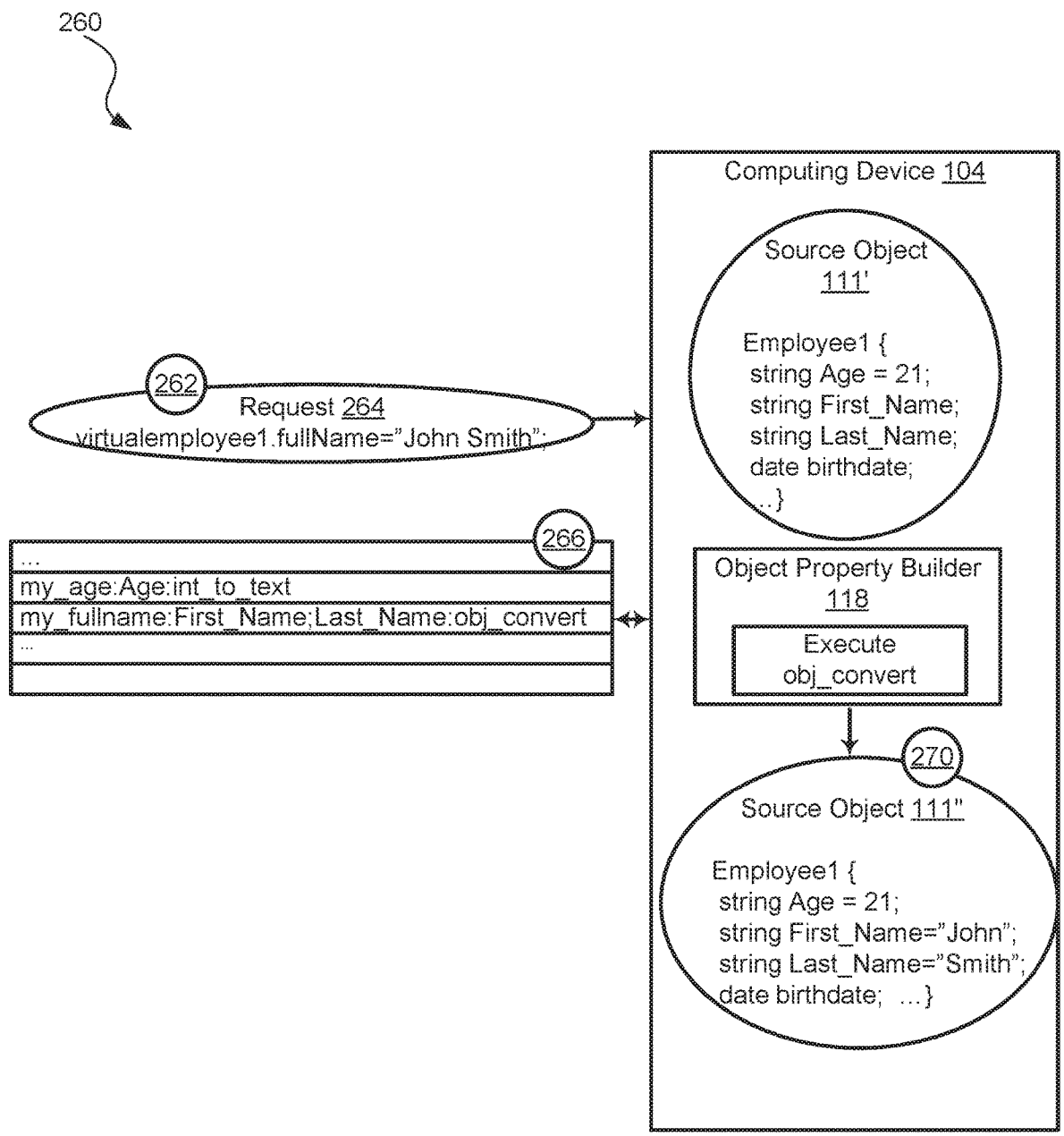

FIGS. 2A-2C are process flow diagrams 200, 230, 260 for interacting with a source object via a virtual object in accordance with one or more embodiments. FIG. 2A is a process flow diagram 200 for defining an interface for interacting with source object 111 in accordance with one or more embodiments. In FIG. 2A, at action 202, translation engine 116 receives a set of properties 204 <string Age> of source object 111, a set of properties 206 <int my_age> of virtual object 120, and a set of functions 208 <int_to_text (string x){ ... }>. The developer may provide input to translation engine 116 to associate set of properties 204 and a set of properties 206, and to further associate set of functions 208 with these properties. The "Age" property in source object 111 corresponds to the "my_age" property in virtual object 120. Here, a user utilizing translation system 115 is able to interact with source object 111 using the "my_age" property of virtual object 120 even though source object 111 does not include this property.

Additionally, set of functions 208 includes the signature of the "int_to_text" function along with its definition. Set of functions 208 may include additional functionality that is not found in program 108. Set of functions 208 associated with sets of properties 204 and 206 may define a set of instructions to execute when set of properties 206 of virtual object 120 is called or used in an instruction. The functionality of program 108, which is stored at computing device 104, may be provided to a user at computing device 102 via translation system 115. In particular, the user may program code that calls properties of virtual object 120 without realizing that the virtual object does not store data in its own memory space and is being used to actually interact with source object 111.

Set of functions 208 may include executing functions in source object 111 or functions developed by the developer. In an example, if the "my_age" property of virtual object 120 is called, the "int_to_text" function checks that the input value (e.g., "my_age" in virtual object 120) is a valid integer and if so, converts the input value into a text string. The "Age" property in source object 111 would then be updated to be the text string. In this example, the integer property "my_age" of the virtual object 120 is being called by the user, not the string "Age" property. Additionally, set of functions 208 associated with the called property "my_age" of virtual object 120 is executed. In this example, set of functions 208 includes providing an extra data integrity check that was not provided by program 108 (checking that the input value is an integer). The user at computing device 102 calls and interacts with virtual object 120 without knowing that the user is actually causing code of set of functions 208 to be executed. Additionally, the user may think that the property "my_age" of virtual object 120 is being updated with the age input value when in actuality, the property "Age" of source object 111 is being updated with the age input value. The user may be unaware that source object 111 and its properties exist because the user is interacting with virtual object 120 and the data store that stores the property associations and function.

At action 212, translation engine 116 receives a set of properties 214 <string First_Name, string Last_Name> of source object 111, a set of properties 216 <string fullName> of virtual object 120, and a set of functions 218 <obj_convert(string x){ ... }>. The "First_Name" and "Last_Name" properties in source object 111 correspond to the "fullName" property in virtual object 120. Additionally, set of functions 218 includes the signature of the "obj_convert" function along with its definition. In an example, the "obj_convert" function receives the full name of an employee as input (e.g., "fullName" in virtual object 120) and saves the first and last names of the "fullName" property into the source object 111 (e.g., "First_Name" and "Last_Name" properties).

At action 220, translation engine 116 associates set of properties 204 with set of properties 206, and stores the association into data store 122. Additionally, at action 222, translation engine 116 associates set of functions 208 with the associated sets of properties 204 and 206, and stores the association into data store 122. Translation engine 116 may perform actions 220 and 222 each time it receives a set of properties of a virtual object with a set of properties of a source object to associate, and a set of functions corresponding to the associated sets of properties. For example, translation engine 116 associates set of properties 214 with set of properties 216, and stores the association into data store 122. Additionally, translation engine 116 associates set of functions 218 with the associated sets of properties 214 and 216, and stores the association into data store 122.

In the example illustrated in FIG. 2, the data store is a hash map 224. This is not intended to be limiting, and the data store may be any storage repository that is capable of storing data and data associations. Hash map 224 is built as part of virtual object 120 and stores one or more mappings of a set of properties and/or attribute functionalities of virtual object 120 to a set of properties and/or attribute functionalities of source object 111. Hash map 204 maps the local properties of virtual object 120 to the properties of source object 111 such that when the user interacts with virtual object 120 the user is actually interacting with source object 111. The associated set of functions may execute some additional code provided by the developer and/or code in program 108.

Translation engine 116 may dynamically create properties or methods in virtual object 120, which directly utilizes the data in source object 111. The property naming standards or convention follow the "local rules" at computing device 102, and any differences in data representation may be handled by translation engine 116. Accordingly, translation engine 116 provides a translation layer so that users of virtual object 120 relate to the properties in accordance with the defined set of functions associated with the properties, while actually utilizing the data in source object 111. In this way, source object 111 is always in sync with virtual object 120.

Object property builder 118 builds properties based on hash map 224. FIG. 2B is a process flow diagram for updating one or more properties of the source object 111 in accordance with one or more embodiments. In FIG. 2B, at action 232, object property builder 118 receives a request 234 to instantiate virtual object 120. Request 234 may include "VirtualEmployee virtualemployee1," which corresponds to an object of the "Employee" class 110. Hash map 224 stores the properties of virtual object 120 that are associated with the properties of source object 111, along with the function(s) to be executed when the properties of virtual object 120 are called. Hash map 224 provides the translation from the virtual object 120 to source object 111, and object property builder 118 implements the translation.

At action 236, object property builder 118 instantiates a source object 111 in response to request 234. Receiving request 234 to instantiate virtual object 120 causes source object 236 to be instantiated. Source object 111 is an instantiation of the "Employee" class 110 defined in program 108. In some examples, object property builder 118 instantiates source object 111 by invoking a remote procedure call (RPC) at computing device 102, which stores program 108, and receives source object 111 responsive to invoking the RPC. In some examples, object property builder 118 instantiates source object 236 by invoking an application programming interface (API) at computing device 102. It is important to note that while virtual object 120 is instantiated in response to request 234, all mapped attributes are actually stored in the source object 111. This is because the mapped attributes of virtual object 120 do not actually exist. The memory that would be assigned to virtual object 120 is actually assigned to source object 111.

At action 240, object property builder 118 receives a request 242 to perform an operation using set of properties 206 (<int my_age>) of virtual object 120. Request 242 includes "virtualemployee1.my_age=21." At action 244, object property builder 118 searches the data store (e.g., hash map 224) for set of properties 206 of the virtual object included in the request 242 and identifies set of functions 208 corresponding to the set of properties 206 of virtual object 120. At action 246, object property builder 118 executes the identified set of functions, which correspond to associated sets of properties 204 and 206. In particular, object property builder 118 executes the "int_to_text" function. At action 248, object property builder 118 updates set of properties 206 of source object 111 in accordance with a result of the executed set of functions. In particular, object property builder 118 updates the "Age" property in source object 111 to be 21, as described above and shown in updated source object 111'. By using hash map 244, object property builder 118 knows how to handle calls to virtual object 120's properties. In keeping with the above example, object property builder 118 may check to ensure that the input value into "my_age" is an integer and if so, convert the integer into a string and store the string into the property of source object 111 that corresponds to the "my_age" property of virtual object 120. Here, a user utilizing translation system 115 is able to interact with source object 111 using the "my_age" property of virtual object 120 even though source object 111 does not include this property name. Additionally, source object 111 is a more secure entity because translation system 115 provides security functionality that is not found in program 108.

FIG. 2C is another process flow diagram for updating one or more properties of source object 111 in accordance with one or more embodiments. At action 262, object property builder 118 receives a request 264 to perform an operation using set of properties 216 (<string fullName>) of virtual object 120. Request 264 includes "virtualemployee1.fullName="John Smith." At action 266, object property builder 118 searches the data store (e.g., hash map 224) for set of properties 216 of the virtual object included in the request 264 and identifies set of functions 218 corresponding to set of properties 216 of virtual object 120. At action 268, object property builder 118 executes identified set of functions 218, which corresponds to associated sets of properties 214 and 216. In particular, object property builder 118 executes the "obj_convert" function.

The string "John Smith" is the input value of the "fullName" property of virtual object 120. In an example, the "obj_convert" function updates the "First_Name" property of source object 111 with the first string of the input value "John Smith" and updates the "Last_Name" property of source object 111 with the last string of the input value "John Smith." At action 270, object property builder 118 updates set of properties 216 of source object 111' in accordance with a result of the executed set of functions. In particular, object property builder 118 updates the "First_Name" and "Second_Name" properties in source object 111' to be "John" and "Smith," respectively, as shown in updated source object 111".

As discussed above and further emphasized here, FIGS. 1 and 2A-2C are merely examples, which should not unduly limit the scope of the claims. For example, it should be understood that one or more modules (e.g., translation engine 116 and object property builder 118) may be combined with another module. It should also be understood that one or more modules in 1 and 2A-2C (e.g., translation engine 116 or object property builder 118) may be separated into more than one module.

Additionally, it should be understood that the developer may use virtual object 120 to change the property names of source object 111 and may program translation system 115 such that it has the same functionality as program 108. In an example, the developer may desire to change one or more property names in source object 111 and associate these property names with one or more property names in virtual object 120. In this example, the developer may have a different naming standard or convention for properties than the source object.

In some examples, translation system 115 includes a logger that logs the execution of the one or more executed functions and its associated properties into a log. Logging the execution of functions may allow a developer to gauge how many times particular properties of the virtual object 120 have been called or the popularity of particular functions. Although program 108 is illustrated as being stored in a different computing device from that one that stores translation engine 116 and object property builder 118, this is not intended to be limiting. In other examples, program 108 may be stored in the same computing device as that which executes translation engine 116 and object property builder 118. It is important to note the source object is disconnected from the local object and can be used on its own without the local object that modified it.

IV. Example Method

Figure 3:
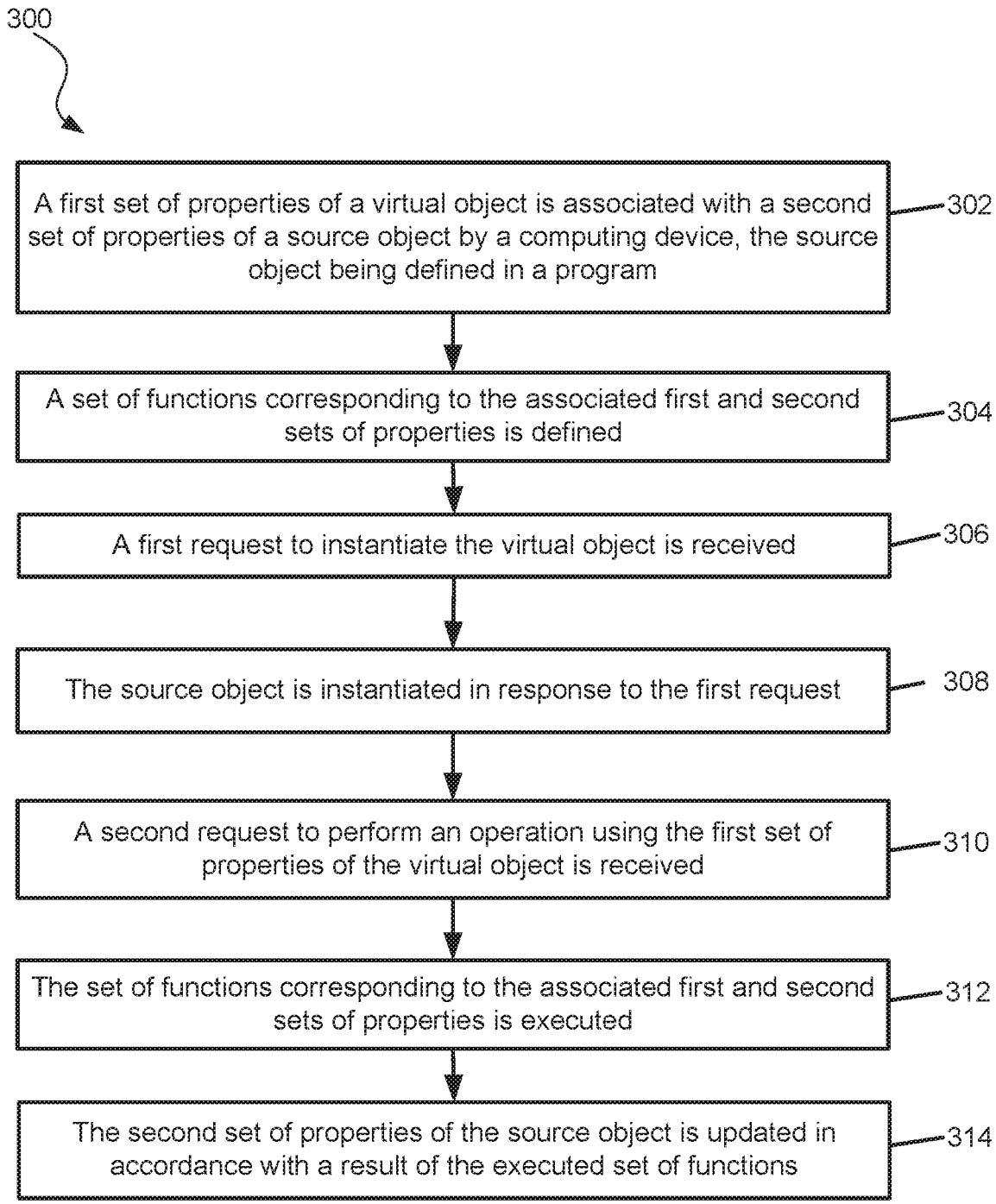
FIG. 3 is a simplified flowchart illustrating a method of interacting with a source object via a virtual object in accordance with one or more embodiments.

FIG. 3 is a simplified flowchart illustrating a method 300 of interacting with a source object via a virtual object in accordance with one or more embodiments. Method 300 is not meant to be limiting and may be used in other applications. Method 300 may be performed by processing logic that may include hardware (e.g., circuitry, dedicated logic, programmable logic and microcode), software (such as instructions run on a computer system, specialized hardware, dedicated machine, or processing device), firmware, or a combination thereof. In some examples, the method is performed by the system 100 illustrated in FIG. 1. For example, the method 300 may be performed on computing device 104. In some examples, the order of the actions described below may also be performed according to alternative orderings. In yet other examples, additional actions may be added and actions that are described may be removed Method 300 includes steps 302-314. In block 302, a first set of properties of a virtual object is associated with a second set of properties of a source object, the source object being defined in a program. In an example, translation engine 116 associates set of properties 206 of virtual object 120 with set of properties 204 of source object 111, the source object being defined in program 108 stored remotely from computing device 104. In block 304, a set of functions corresponding to the associated first and second sets of properties is defined. In an example, translation engine 116 defines set of functions 208 corresponding to associated sets of properties 204 and 206. The set of functions may be provided by a developer and may include functionality not found in program 108. For example, the set of functions may include instructions to execute one or more instructions that are not in program 108. Additionally, the set of functions may include one or more class methods from program 108 to be executed.

In block 306, a first request to instantiate the virtual object is received. In an example, translation engine 116 receives request 232 to instantiate virtual object 120. In block 308, the source object is instantiated in response to the first request. In an example, object property builder 118 instantiates source object 111 in response to request 232. In this example, virtual object 120 is not instantiated in response to request 232 because virtual object 120 does not actually exist. Rather, data store 122 is a "layout" of the virtual object that is used by object property builder 118 to dynamically build properties and to update source object 110.

In block 310, a second request to perform an operation using the first set of properties of the virtual object is received. In an example, object property builder 118 receives request 242 to perform an operation using set of properties 206 of virtual object 120. A set of properties of virtual object 120 may be associated with a set of properties of source object 111 if the second request causes the second set of properties in the source object to be updated.

In block 312, the set of functions corresponding to the associated first and second sets of properties is executed. In an example, object property builder 118 executes set of functions 208 corresponding to the associated sets of properties 204 and 206. In block 314, the second set of properties of the source object is updated in accordance with a result of the executed set of functions. In an example, object property builder 118 updates set of properties 204 of source object 111 in accordance with a result of the executed set of functions 308.

It is also understood that additional method steps may be performed before, during, or after steps 310-340 discussed above. It is also understood that one or more of the steps of method 300 described herein may be omitted, combined, or performed in a different sequence as desired.

V. Example Computing System

Figure 4:
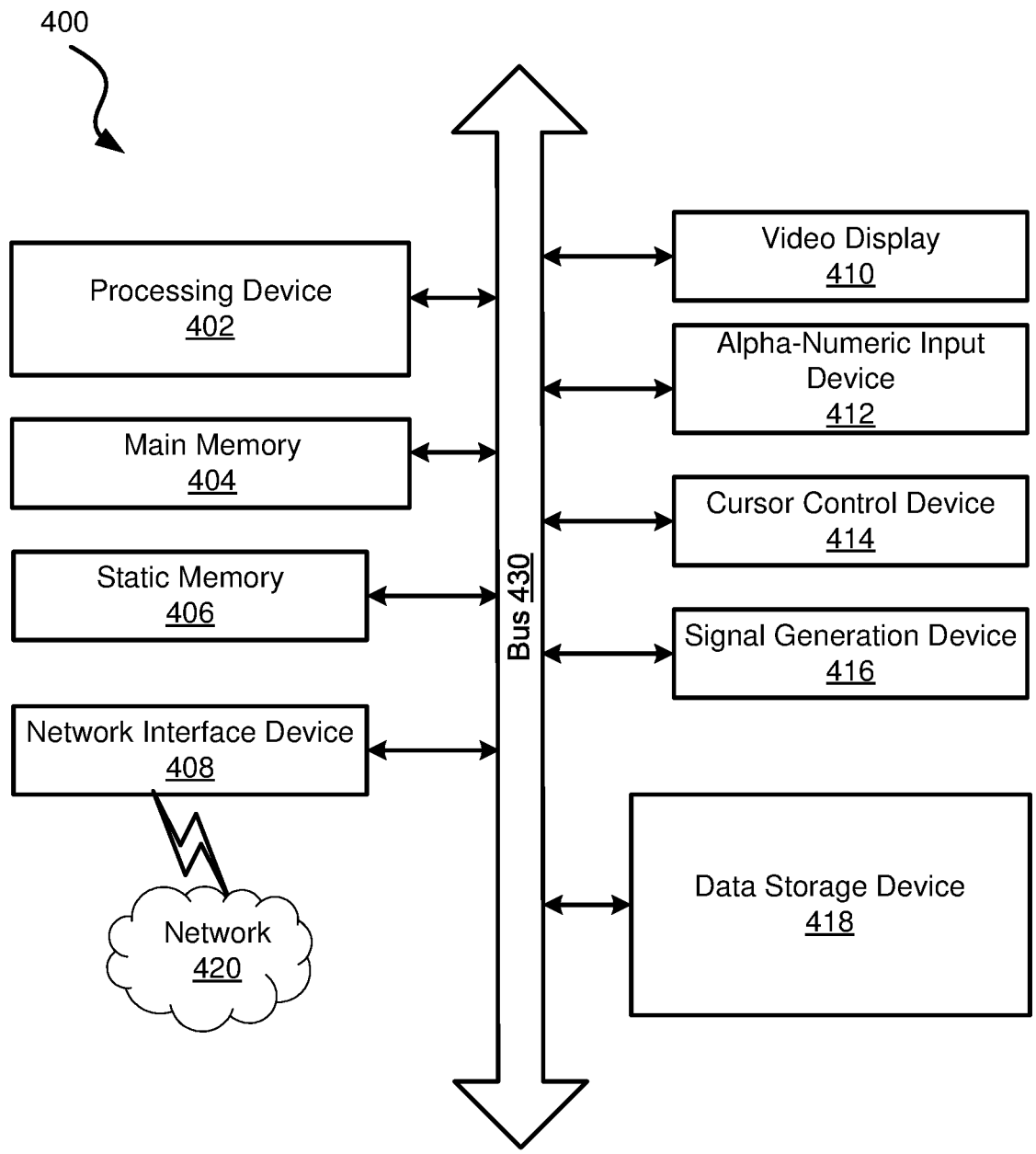
FIG. 4 is a block diagram of an electronic system suitable for implementing one or more embodiments of the present disclosure.

FIG. 4 is a block diagram of a computer system 400 suitable for implementing one or more embodiments of the present disclosure. In various implementations, distribution node 110 may include a client or a server computing device. The client or server computing device may include one or more processors. The client or server computing device may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component such as a display 411, and an input control such as a cursor control 413 (such as a keyboard, keypad, mouse, etc.). An optional audio input/output component 405 may also be included to allow a user to use voice for inputting information by converting audio signals into information signals. Audio I/O component 405 may allow the user to hear audio. A transceiver or network interface 406 transmits and receives signals between computer system 400 and other devices via a communication link 418 to a network. In an embodiment, the transmission is wireless, although other transmission mediums and methods may also be suitable. A processor 412, which may be a microcontroller, digital signal processor (DSP), or other processing component, processes these various signals, such as for display on computer system 400 or transmission to other devices via communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 414, and transmission media includes coaxial cables, copper wire, and fiber optics, including wires that include bus 402. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method comprising:
receiving, by a computing device, a first request to instantiate a virtual object, the virtual object being a first object-oriented object having a first property, a source object being a second object-oriented object having a second property and being defined in a program, and the virtual object's data being stored in a memory of the source object;
instantiating the source object in response to the first request;
receiving, by the computing device, a second request to update the first property with an input value;
executing a function corresponding to the first and second properties in response to the second request, the function having the first property as an input parameter and applying a data integrity check on the input value; and
updating the second property of the source object with the input value in response to a determination that the input value passes the data integrity check.

2. The method of claim 1, further including:
storing an association between the first property and the second property into a data store;
storing the function corresponding to the first and second properties into the data store;
searching the data store for the first property of the virtual object included in the second request; and
identifying, based on searching the data store, the function corresponding to the first and second properties.

3. The method of claim 1, further including:
storing an association between the first property of the virtual object and the second property of the source object into an entry of a hash map; and
storing the function corresponding to the first and second properties into the entry of the hash map.

4. The method of claim 1, wherein instantiating the source object includes invoking a remote procedure call (RPC) at a second computing device that stores the program, and receiving the source object responsive to invoking the RPC.

5. The method of claim 1, wherein instantiating the source object includes invoking an application programming interface (API) at a second computing device that stores the program.

6. The method of claim 1, further comprising:
logging the execution of the function into a log.

7. The method of claim 1, further comprising:
providing a user with a first user interface (UI) for associating one or more properties of the virtual object with one or more properties of the source object;
receiving via the first UI a user input indicating that the first property is associated with the second property; and
storing an association between the first and second properties into a data store.

8. The method of claim 7, further comprising:
providing the user with a second UI for defining one or more functions corresponding to the first and second properties;
receiving via the second UI the function corresponding to the first and second properties; and
storing an association between the function and the first and second properties into the data store.

9. The method of claim 1, wherein the virtual object has a first set of methods, the source object has a second set of methods, and function is absent from the first set of methods and the second set of methods.

10. The method of claim 1, wherein the function is absent from the program.

11. The method of claim 1, wherein applying the data integrity check includes:

determining that the input value passes the data integrity check in response to a determination that a first data type of the input value is the same as a second data type of the second property; and in response to a determination that the first data type is not the same as the second data type:
converting the input value to the second data type; and
updating the second property of the source object with the converted input value having the second data type.

12. A system comprising:
a first memory that stores an association between a first set of properties of a virtual object and a second set of properties of a source object and stores a function corresponding to the first and second properties, wherein the source object is defined in a program that is written in an object-oriented programming language, wherein the virtual object has a first set of methods, the source object has a second set of methods, and the function is absent from the first and second sets of methods, and wherein the first set of properties is absent from the source object, and wherein the virtual object's data is stored in a second memory of the source object; and
an object property builder that receives a first request to instantiate the virtual object, instantiates the source object in response to the first request, receives a second request to update the first set of properties with an input value, and executes the function in response to the second request, wherein execution of the function maps a first portion of the input value to a first property of the second set of properties and maps a second portion of the input value to a second property of the second set of properties,
wherein the object property builder updates the first property of the source object with the first portion of the input value and updates the second property of the source object with the second portion of the input value.

13. The system of claim 12, wherein the object property builder searches the first or second memory for the first set of properties of the virtual object included in the second request and identifies the function corresponding to the first set of properties of the virtual object.

14. The system of claim 12, wherein an association between the first and second sets of properties and the function are stored in a hash map.

15. The system of claim 12, wherein the object property builder invokes a remote procedure call (RPC) at a computing device that stores the program and receives the source object responsive to invoking the RPC.

16. The system of claim 12, wherein the object property builder invokes an application programming interface (API) and receives the source object responsive to invoking the API.

17. The system of claim 12, wherein the program does not include the functionality of the function.

18. A non-transitory machine-readable medium comprising a plurality of machine-readable instructions that when executed by one or more processors is adapted to cause the one or more processors to perform a method comprising:
receiving, by a computing device, a first request to instantiate a virtual object, the virtual object being a first object-oriented object having a first set of properties, a source object being a second object-oriented object having a second set of properties and being defined in a program, and wherein the virtual object's data being stored in a memory of the source object;
instantiating the source object in response to the first request;
receiving, by the computing device, a second request to update the first set of properties with a set of values;
executing a set of functions corresponding to the first and second sets of properties in response to the second request, the set of functions specifying one or more operations to perform on the set of values;
updating a first property of the second set of properties of the source object with a first value of the set of values in accordance with a first result of a first function of the executed set of functions; and
updating a second property of the second set of properties of the source object with a second value of the set of values in accordance with a second result of a second function of the executed set of functions.

19. The non-transitory machine-readable medium of claim 18, wherein the virtual object has a first set of methods, the source object has a second set of methods, and the set of functions is absent from the first set of methods and the second set of methods.

20. The non-transitory machine-readable medium of claim 18, the method further comprising:
providing a user with a first user interface (UI) for associating one or more properties of the virtual object with one or more properties of the source object;
receiving via the first UI a user input indicating that the first property is associated with the second property; and
storing an association between the first and second properties into a data store.

* * * * *